C. RENSHAW.
SPEED REGULATION FOR DYNAMO ELECTRIC MACHINES.
APPLICATION FILED AUG. 2, 1905.

974,433. Patented Nov. 1, 1910

WITNESSES:
Fred H. Miller
R. J. Dearborn

INVENTOR
Clarence Renshaw
BY
Wesley G. Carr
ATTORNEY

UNITED STATES PATENT OFFICE.

CLARENCE RENSHAW, OF SWISSVALE, PENNSYLVANIA, ASSIGNOR TO WESTINGHOUSE ELECTRIC & MANUFACTURING COMPANY, A CORPORATION OF PENNSYLVANIA.

SPEED REGULATION FOR DYNAMO-ELECTRIC MACHINES.

974,433. Specification of Letters Patent. Patented Nov. 1, 1910.

Application filed August 2, 1905. Serial No. 272,397.

*To all whom it may concern:*

Be it known that I, CLARENCE RENSHAW, a citizen of the United States, and a resident of Swissvale, in the county of Allegheny and State of Pennsylvania, have invented a new and useful Improvement in Speed Regulation for Dynamo-Electric Machines, of which the following is a specification.

My invention relates to means for regulating the speed of dynamo-electric machines, and particularly to such means as are adapted for regulating the speed of alternating current, commutator type motors.

The object of my invention is to provide means for automatically varying the speed of commutator type motors that shall be simple in arrangement and construction and effective in operation and that shall be dependent upon the current flowing in a predetermined electric line conductor or upon the current delivered from an electric generator.

It is often desirable to automatically vary the speed of a motor as the current delivered from an electric generator is varied and this result has usually been accomplished, in the prior art, with direct current electric machines, by employing a compound wound motor, the series field magnet winding of which was connected in series with the generator circuit and acted in opposition to the shunt field magnet winding, so that an increase in the generator load increased the series field, which served to weaken the resultant field and, consequently, to increase the motor speed, and vice versa.

Since alternating current, commutator type motors may be advantageously employed for purposes which make variations in motor speeds substantially in proportion to variations of the generator current desirable, I have illustrated and described my invention as applied to such motors, but desire that it shall not be limited to any specific type of motors or circuit arrangements.

My invention is illustrated in the accompanying drawings, in which—

Figure 1:
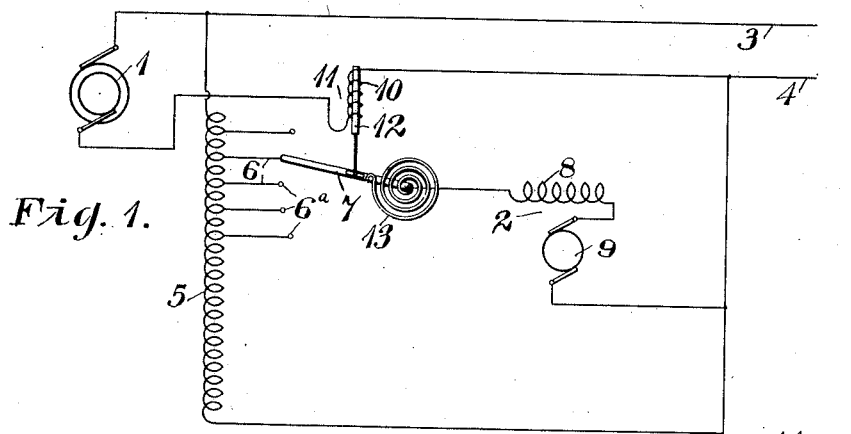
Figure 2:
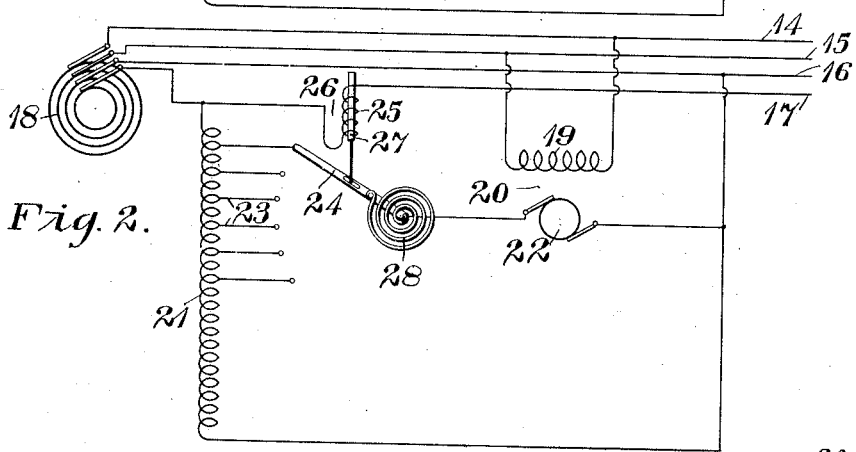
Figure 3:
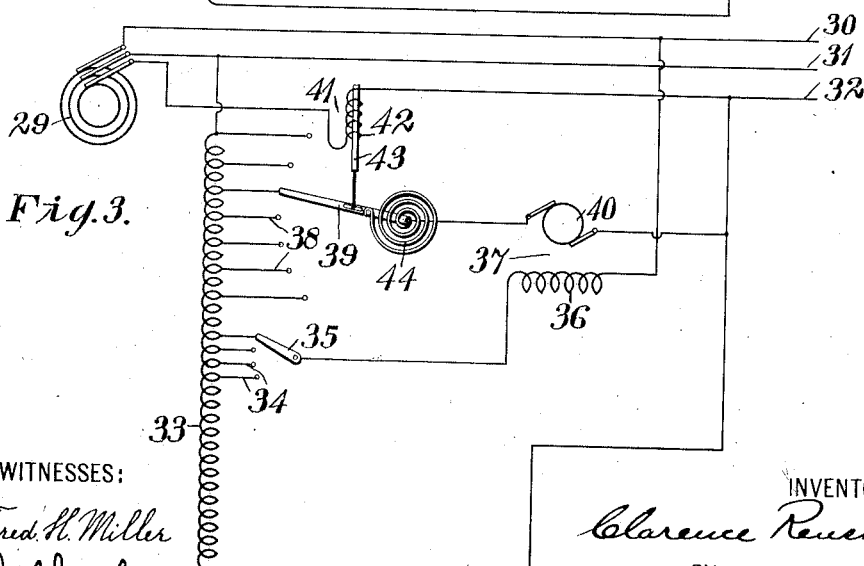

Figure 1 is a diagrammatic view of the circuit connections for a system of motor control embodying a single-phase generating unit, and Figs. 2 and 3 are similar views of systems embodying, respectively, two and three-phase electric current generators.

Referring particularly to Fig. 1, alternating current electrical energy is supplied from a single-phase generator 1 to a motor 2 through an external circuit 3—4. An auto-transformer 5 is connected across the circuit 3—4 and is provided with a plurality of taps 6 having contact terminals 6ª that are in position to be engaged by a movable contact arm 7. The field magnet winding 8 and the armature 9 of the motor 2 are connected in series, the outer terminals being connected, respectively, to the movable contact member 7 and to one extremity of the winding of the auto-transformer 5. The magnetizing winding 10 of an electro-magnet 11 is connected in series with the interrupted line conductor 4 and is provided with an armature 12 which is actuated, in opposition to a spring 13 on the contact arm 7, to move the arm over the contact terminals 6ª and thereby vary the voltage applied to the motor and, consequently, the motor speed, as the current taken from the generator 1 and flowing through the magnetizing winding 10 varies, since the armature 12 of the electro-magnet 11 is so mechanically connected to the contact arm 7 that motion is transmitted from the one to the other. As the generator load decreases, the magnetic pull exerted by the winding 10 is weakened, so that the contact arm 7 is moved into engagement with a lower-voltage tap on the auto-transformer 5 by the spring 13.

Referring to Fig. 2, alternating currents which are substantially in quadrature relation are supplied to the external circuits 14—15 and 16—17 from a two-phase alternating current generator 18. A field magnet winding 19 of a motor 20 is connected across the circuit 14—15 and an auto-transformer 21, which supplies energy to an armature 22 of the motor 20, is connected across the external circuit 16—17 and is provided with a plurality of taps 23, which correspond to the taps 6 in Fig. 1 and have contact terminals that are similarly engaged by a movable contact arm 24 that is connected to one terminal of the armature 22, the opposite terminal of which is connected to one extremity of the winding on the auto-transformer 21. A magnetizing winding 25 of an electro-magnet 26, which corresponds to the electro-magnet 11 of Fig. 1, is connected in series with the interrupted line conductor 17 and is provided with an armature 27 which is mechanically connected to the movable contact arm 24 and acts, in opposition to a spring 28, to move the arm into engagement with the contact terminals of the various auto-transformer taps 23, the spring 28 being attached to the arm 24 and tending to hold the arm in engagement with the lowest-voltage tap. When the load on the generator 18 is relatively small, the spring 28 holds the contact arm 24 in engagement with the contact terminal of a low-voltage tap of the auto-transformer 21, so that the speed of the motor 20 is decreased, and, as the load on the generator 18 increases, the magnetization of the coil 25 is increased, the movable contact arm 24 is moved into engagement with the contact terminal of a higher-voltage tap and the speed of the motor is correspondingly increased. By connecting a motor field magnet winding across the external circuit of the generator corresponding to one current phase and its armature across the circuit corresponding to the other phase, the phase relation between the currents in the armature and field may readily be regulated to give a satisfactory operation of the motor.

Referring to Fig. 3, alternating current energy is supplied from a three-phase generator 29 to the external circuits 30, 31 and 32. An auto-transformer 33 is connected across the circuit 31—32 and is provided with a plurality of taps 34 that are located near its middle point and have contact terminals that are engaged by a movable contact arm 35 which is connected to one terminal of a field magnet winding 36 of the motor 37, the other field magnet terminal being connected to the line conductor 30. The auto-transformer 33 is further provided with a plurality of taps 38 which correspond to the taps 6 and 23 of Figs. 1 and 2, respectively, and are similarly provided with contact terminals to be engaged by a movable contact arm 39 which is connected to one terminal of the armature 40 of the motor 37, the other terminal of the armature being connected to one extremity of the auto-transformer 33.

An electro-magnet 41 is provided with a magnetizing winding 42, which is connected in series with the interrupted line conductor 32, and with an armature 43 which is mechanically connected to the arm 39 and may be actuated to move the arm 39, in opposition to a spring 44, into engagement with the contact terminals of the taps 38 of the auto-transformer 33. The movable contact arm 35 which engages the tap 34 near the middle point of the transformer, may be varied manually to adjust the phase relation between the armature currents and the field currents of the motor, so that satisfactory operation may result.

The speed of the motor is varied as the current flowing through the external circuit 32 varies, in a manner similar to that explained in connection with Figs. 1 and 2. The motor speed will therefore be varied substantially as the current of the generator 29 varies, since the currents in the three phases are substantially balanced.

I desire that all variations in circuit connections and mode of operation which effect similar results shall be included within the scope of my invention.

I claim as my invention:

1. The combination with an alternating current electric generator, an auto-transformer supplied with energy from said generator and provided with spaced contact terminals, and a motor electrically connected thereto, of means dependent upon the current delivered by the generator for varying the voltage applied to said motor, said means comprising an electro-magnet winding connected in the external circuit of the generator, independently of the auto-transformer, an armature for said winding and a movable contact member connected to said armature and adapted to engage said auto-transformer contact terminals.

2. The combination with a polyphase electric circuit, a motor having a field magnet connected to one phase of said circuit and an armature connected to another phase thereof, of an auto-transformer interposed between the armature and said circuit, and means dependent upon the current traversing the circuit for automatically varying the active length of the transformer winding.

3. The combination with a polyphase alternating current electric generator, a motor having its armature and field magnet supplied with energy from different phases of said circuit, and an auto-transformer interposed between the generator and at least one of the members of the motor, of means dependent upon the current delivered by the generator for automatically varying the active length of the auto-transformer winding and the speed of the motor.

4. The combination with a two-phase alternating current electric generator, two external circuits therefor, a single-phase electric motor having a field magnet supplied with energy from one of said circuits, and an auto-transformer interposed between the motor armature and the other circuit, of means for automatically varying the active length of the transformer winding and the speed of the motor as the current delivered by the generator varies, said means comprising a switching device and an actuating magnet included in one of the generator circuits.

5. The combination with a two-phase alternating current electric generator, two external circuits therefor, an auto-transformer connected across one of said circuits and an electric motor supplied with energy therefrom, the field magnet winding of said motor being connected across the other external generator circuit and one of the armature terminals of said motor being connected to one terminal of said transformer, of a movable contact arm connected to the other armature terminal and adapted to engage any one of various taps in the transformer to vary the voltage supplied from the transformer to the motor, and means for moving said contact arm substantially as the current in the external generator circuit varies.

6. The combination with a two-phase electric generator, two external circuits therefor, a motor field magnet winding connected across one of said circuits, an auto-transformer connected across the other external circuit, an electro-magnet winding included in one side of the last-named circuit, and a motor armature supplied with energy from said transformer, of means for varying the voltage applied to the motor as the currents in the external generator circuits vary, said means comprising a movable contact member which may be actuated by the armature of said electro-magnet to engage any one of various taps in said auto-transformer, and a spring that opposes the action of said electro-magnet.

In testimony whereof, I have hereunto subscribed my name this 31st day of July, 1905.

CLARENCE RENSHAW.

Witnesses:
F. E. WYNNE,
BIRNEY HINES.